Feb. 14, 1950     T. WEBER     2,497,481
WHEEL GAUGE
Filed Oct. 3, 1945
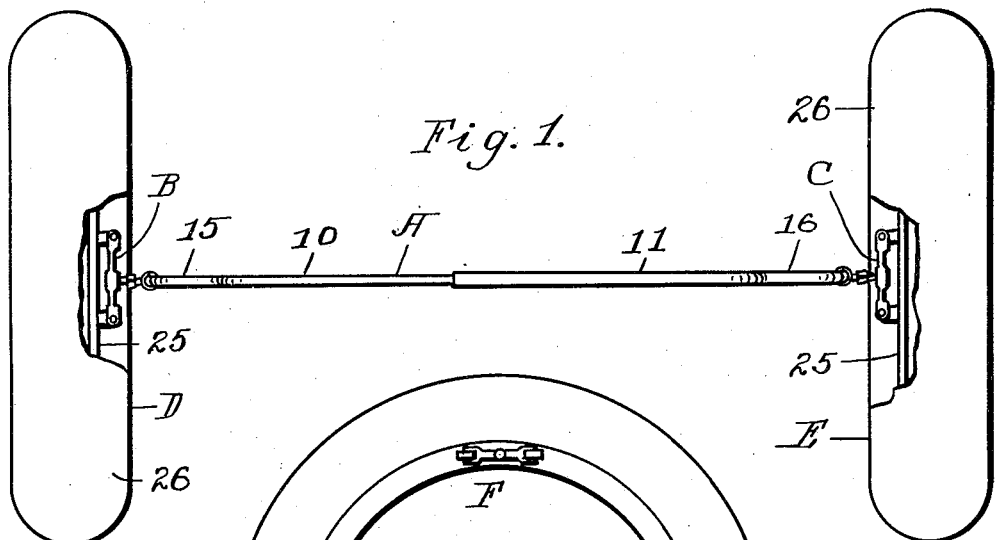
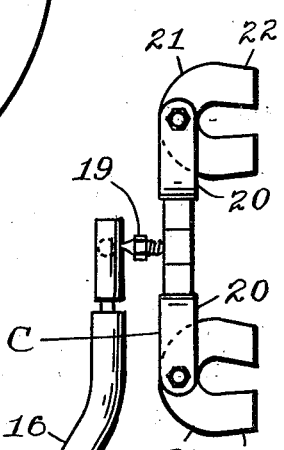
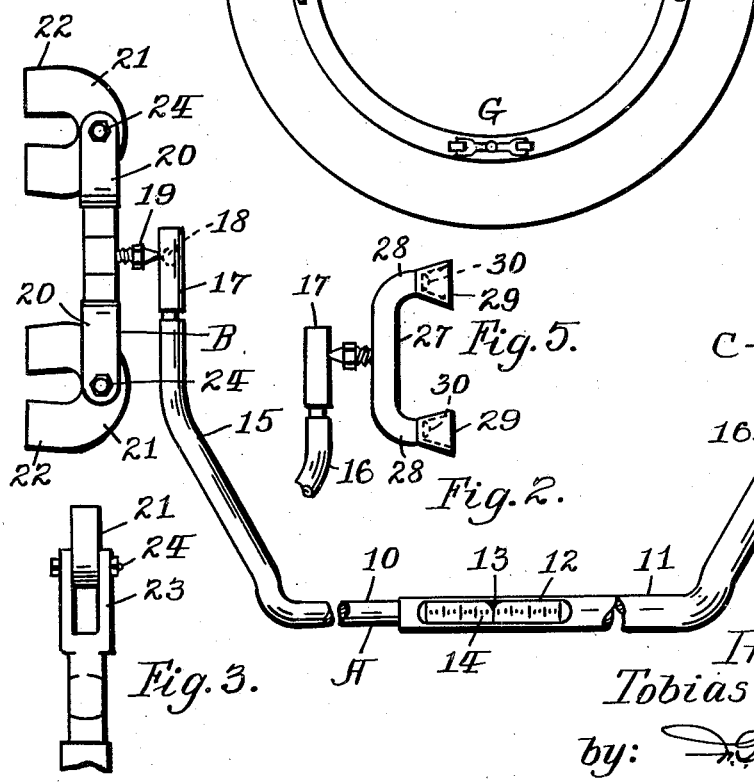
Inventor:
Tobias Weber,
by: *[signature]*
Attorney.

Patented Feb. 14, 1950

2,497,481

UNITED STATES PATENT OFFICE 2,497,481

WHEEL GAUGE

Tobias Weber, Los Angeles, Calif.

Application October 3, 1945, Serial No. 619,961

1 Claim. (Cl. 33—203.2)

This invention relates to improvements in a combined camber and toe in gauge for use in determining the planes in which the members of a pair of wheels on a vehicle revolve in relation to each other. More particularly my improvements provide a ready and convenient device by which the relative inclination of a pair of carrier wheels vertically and longitudinally can be measured, whereby both the "camber" and "toe in" of the wheels can be easily and accurately adjusted. My improved gauge is applicable to the metallic rims of a pair of carrier wheels, the primary object being to provide simple and effective means which is easily applied in use for measuring and adjusting the relative amount of camber and toe in, which is provided in a quick and efficient manner. Among further objects are maximum simplicity and inexpensive construction and increased effectiveness in use.

In the accompanying drawing forming part of this specification, Fig. 1 is a front elevation illustrating my improved gauge applied to a pair of carrier wheels in accordance with my invention; Fig. 2 is a plan on an enlarged scale of my improved gauge, portions of the extensible transverse measuring arm being broken away; Fig. 3 is an end elevational view of a portion of one of the applicators by which the gauge is applied in use to one of the carrier wheels; Fig. 4 is a diagrammatic view illustrating the manner in which my improved gauge is used, and Fig. 5 is a side elevation of a detail showing an alternative construction of one of the applicators.

Referring to the drawing, A designates an extensible transverse measuring arm which is of tubular construction and made in two sections 10 and 11. The median portion of this arm is substantially straight and its sections are telescoped together and provided with a sight opening 12 and pointer 13 in one member and a cooperating scale 14 on the other member below said sight opening (Fig. 2), by which the distance between portions of a pair of wheels to be measured can be determined as hereinafter described. The opposite end portions of the sections 10 and 11 of the arm are formed with a pair of forwardly extending reach-members 15 and 16 to the extremities of which are attached a pair of applicators B and C by universal joints. Each of the universal joints comprises a socket member 17 which is secured to the end of the adjacent reach member and a ball 18 which supports a screw fastener 19, the latter being secured in the body of the member 20 of the adjacent applicator.

The body member of each applicator comprises a substantially straight arm to each of the opposite ends of which is secured a permanent horseshoe magnet 21. The pole pieces 22 of the two magnets on each applicator face laterally in an outward direction apart. Each end of the body member is bifurcated at 23 (Fig. 3) and the body of the adjacent magnet is secured between the members of the bifurcations by a bolt 24 or other suitable fastening means. The universal joint and the arm 20 of each applicator thus functions as an equalizing support for the pair of magnets on the extremities of the extensible measuring arm.

My improved gauge is particularly applicable for measuring camber and toe in in a pair of vehicle wheels, such as D and E shown in Fig. 1 having the usual metallic tire rims such as 25 and resilient pneumatic tires such as 26 as indicated in Fig. 1. In use the vehicle is first raised so that the wheels of the pair to be measured are free to revolve. The pairs of magnets of the opposite applicators are then attached by their pole pieces to corresponding portions on the inner faces of the rims of the pair of wheels to be measured while the measuring arm A is held in horizontal position between said wheels with its body portion forward in position so that its measuring scale is exposed within sight of the user. The wheels of the pair to be measured can then be turned into various positions of a revolution while the measuring arm A is retained substantially horizontal through the use of its journal connections with the applicators so that its scale can be easily read. A single even revolution of the pair of wheels will thus register any variations in distance and angle between the wheels, said variations being transmitted to the extensible measuring arm A and recorded on the scale. Thus to measure camber of the pair of wheels the relative variation between the vertical positions F and G (Fig. 4) is indicated by the scale and the camber of the pair of wheels can be adjusted to produce the amount of camber desired, and to measure toe in the relative variation between the horizontal positions H and I of the pair of wheels is indicated by the scale and can be adjusted to produce the amount of toe in of the pair of wheels desired. During these readings of the scale the universal joints between the extensible measuring arm and the applicators permits the measuring arm to be retained in substantially horizontal position and the reach members 15 and 16 aid the user by supporting the scale out of the way of any interposed mechanism of a vehicle and in more convenient position to be used, In Fig. 5 the magnets are replaced by suction cups 29 which are secured on the outer ends 28 of the arm 27 of each applicator by screws 30, for performing the function of clinging inwardly to the rim of each wheel in stationary position thereon.

In accordance with the patent statutes I have described the principles of operation of my invention together with the construction thereof which I now consider to represent the best embodiment thereof but I desire to have it understood that the structure shown is only illustrative and that the invention can be carried out by other means and applied to other uses without departing from the spirit thereof and within the scope of the following claim.

I claim:

A combined camber and toe in gauge for a pair of oppositely disposed wheels of a vehicle, comprising tubular sectional extendable measuring arms telescoped together and having a scale between said sections for indicating length, and angularly disposed reach arms on the outer end portions of said sectional arms for supporting the measuring arm sections clear of the mechanism of the vehicle, and a pair of applicators on the outer extremities of said reach arms, each of said applicators comprising a body secured by a universal joint extended laterally from between the ends of said body to the side of the companion reach arm on an axis generally parallel to the axis of said measuring arms, and a pair of permanent magnets rigidly secured to the opposite end portions of said body having pole pieces disposed laterally from said body, said magnets being adapted to cling to the inner side surfaces of the rims of a pair of vehicle wheels while the measuring arms are supported in forward substantially horizontal position between said wheels clear of any interposed vehicle mechanism.

TOBIAS WEBER.

REFERENCES CITED

The following references are of record in the file of this patent:

UNITED STATES PATENTS

| Number | Name | Date |
|---|---|---|
| 1,206,476 | Synder | Nov. 28, 1916 |
| 1,712,889 | Knox | May 14, 1929 |
| 1,894,370 | Erickson | Jan. 17, 1933 |
| 2,292,969 | Peters | Aug. 11, 1942 |

FOREIGN PATENTS

| Number | Country | Date |
|---|---|---|
| 394,090 | Great Britain | June 22, 1933 |
| 504,756 | Great Britain | May 1, 1939 |